United States Patent [19]
Koivunen

[11] 3,888,228
[45] June 10, 1975

[54] ENGINE OIL TANK
[75] Inventor: Erkki A. Koivunen, Livonia, Mich.
[73] Assignee: General Motors Corporation, Detroit, Mich.
[22] Filed: Apr. 15, 1974
[21] Appl. No.: 460,927

[52] U.S. Cl............................. 123/196 R; 184/6.5
[51] Int. Cl.............................................. F01m 1/10
[58] Field of Search.......... 123/8.01, 196 R, 198 E; 184/6.2, 6.5, 106; 418/83

[56] References Cited
UNITED STATES PATENTS

| | | | |
|---|---|---|---|
| 3,100,028 | 8/1963 | Booth et al. | 123/196 R |
| 3,101,129 | 8/1963 | Hulten | 184/106 |
| 3,354,988 | 11/1967 | Leonard | 184/106 X |
| 3,653,464 | 4/1972 | Jacobsen et al. | 184/6.5 |

*Primary Examiner*—Manuel A. Antonakas
*Attorney, Agent, or Firm*—Ronald L. Phillips

[57] ABSTRACT

An oil tank is secured to the bottom of a rotary engine and has sealed oil drain, air vent and suction passages through only two sealed connections with the engine.

3 Claims, 6 Drawing Figures

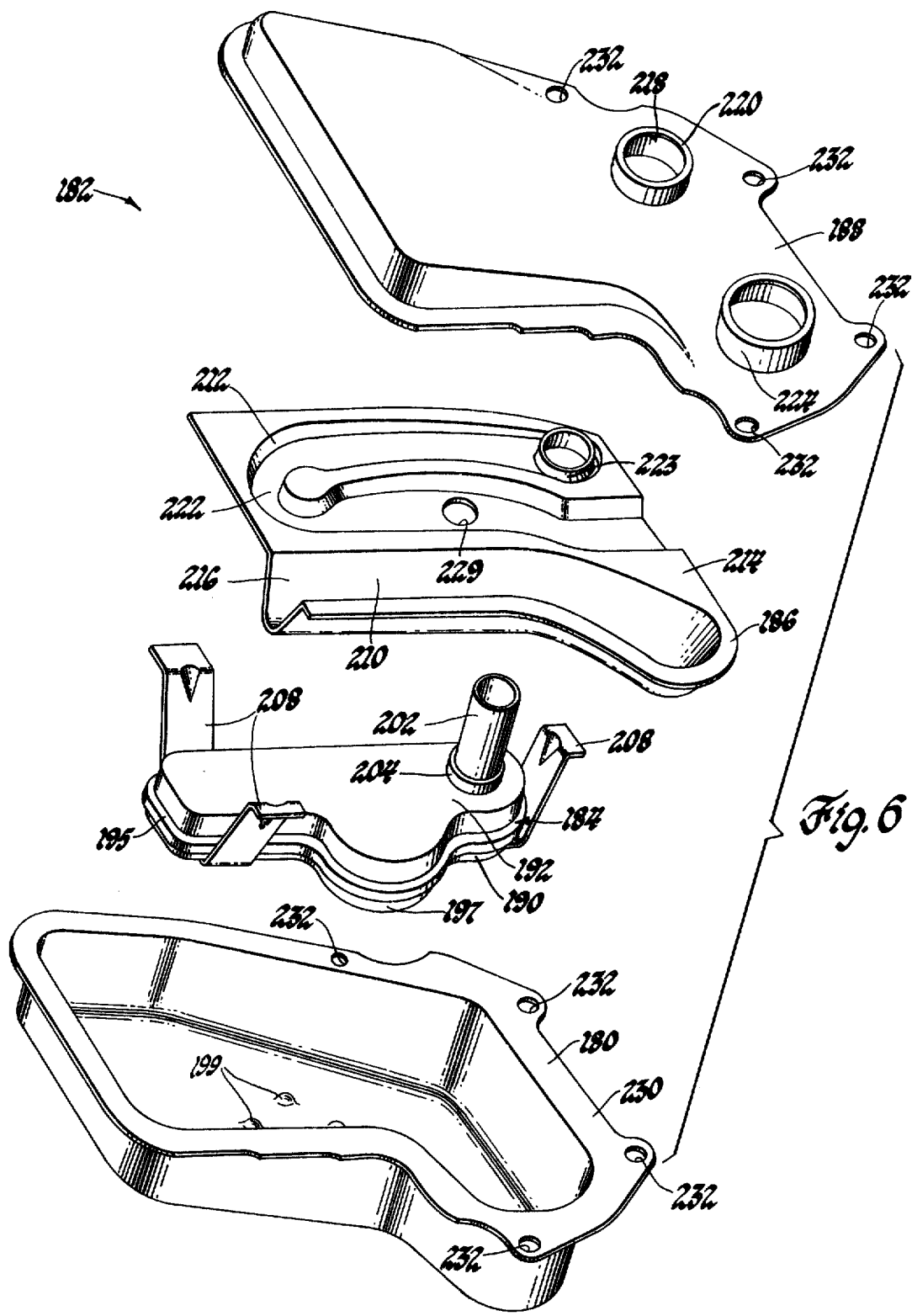

ENGINE OIL TANK

This invention relates to an engine oil tank and more particularly to an internally vented oil tank for a rotary engine.

For a rotary engine, it has been found desirable to use a stamped sheet metal oil tank that is detachably secured yet internally vented. However, the available space for making the necessary delivery, drain and vent connections can be too limited for a conventional hookup and therefore dictate a separate vent pipe which can be undesirable.

An object of the present invention is to provide a new and improved engine oil tank.

Another object is to provide an oil tank for an engine wherein oil normally drains from the engine into the oil tank through one connection, is suctioned from the oil tank to the engine through another connection and the oil tank is vented into the engine through both these connections.

Another object is to provide a closed oil tank for an engine wherein the oil tank has a first sealed connection that allows oil drainage from the engine into the oil tank and in addition allows venting of the oil tank into the engine and another sealed connection with the engine providing a vent passage which also permits venting of the oil tank into the engine and in addition has a suction passage extending therethrough for suctioning oil from the oil tank into the engine.

These and other objects of the present invention will be more apparent from the following description and drawing in which:

FIG. 6 is an exploded view of the oil tank.

Figure 1:
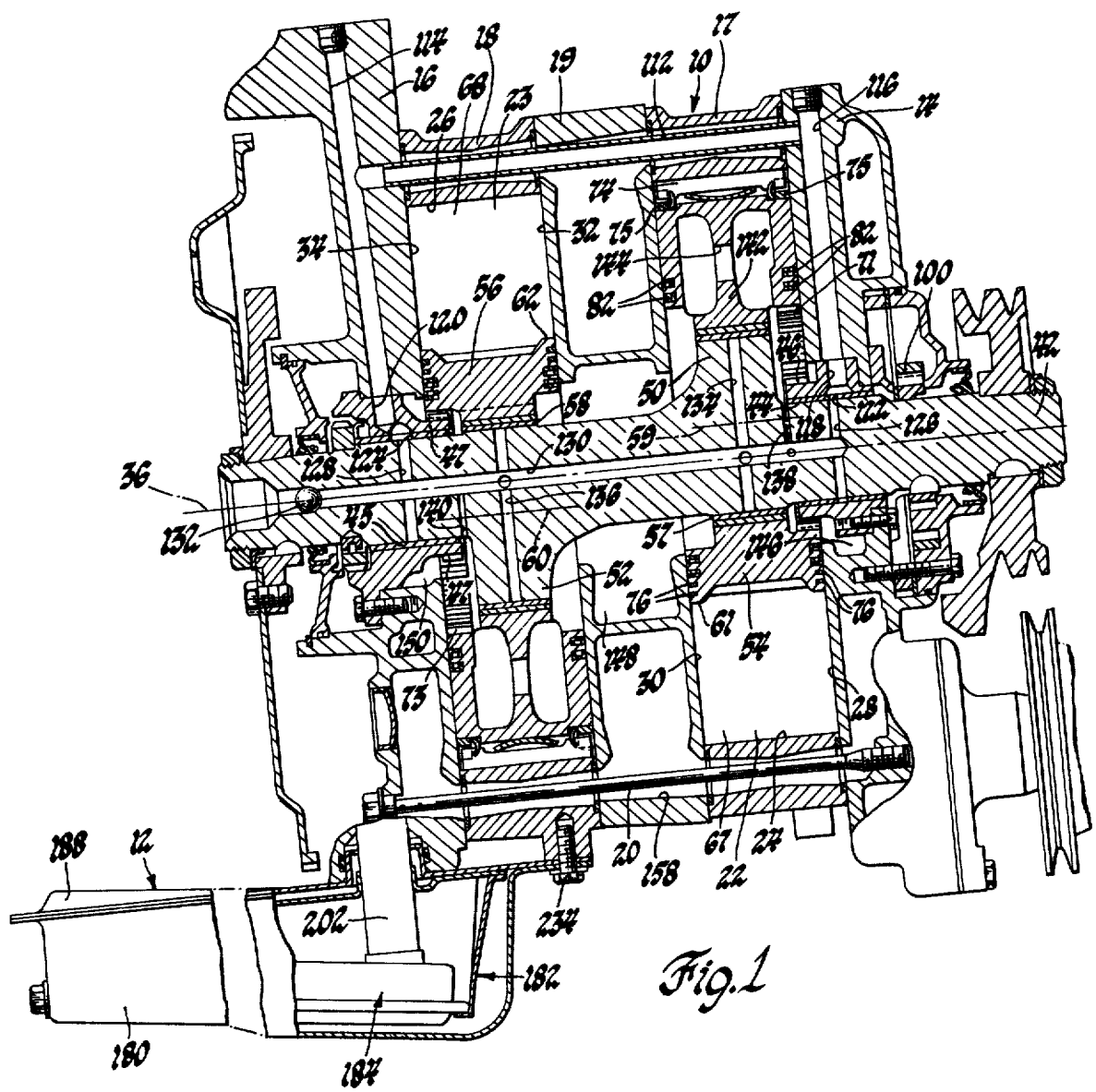
FIG. 1 is a longitudinal view with parts in section of a rotary combustion engine having an oil tank constructed according to the present invention and oriented as installed in a vehicle.
Figure 2:
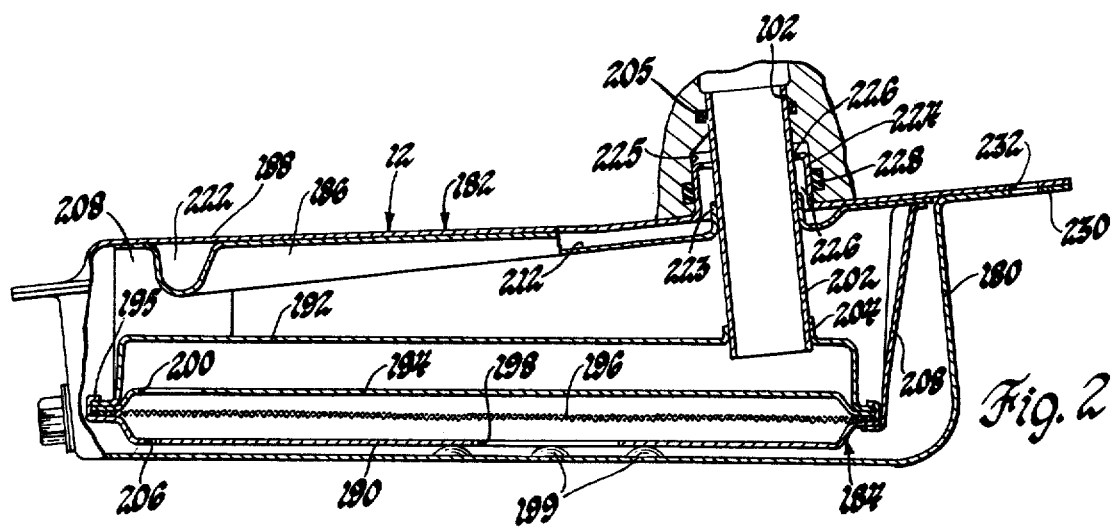
FIG. 2 is a view of the oil pan taken along the line 2—2 in FIG. 3.
Figure 5:
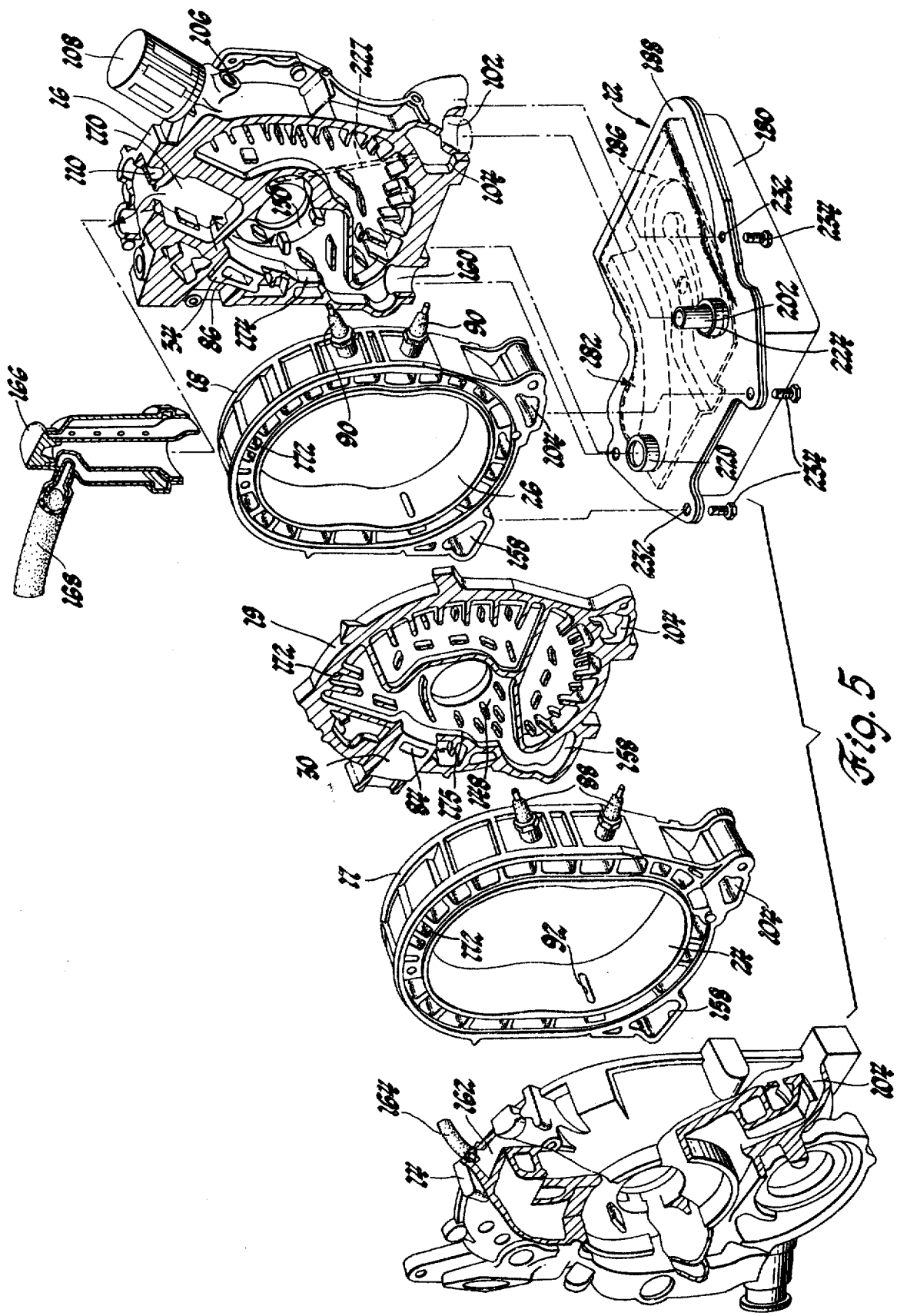
FIG. 5 is an exploded view of certain of the engine parts including the oil tank with the end walls on the intermediate and rear housings cut away to show internal structure.

Referring to FIGS. 1, 2 and 5, there is shown a two-rotor rotary engine 10 having an oil tank 12 according to the present invention wherein the oil tank because of space limitations extends a major portion of its length past the rear end of the engine. The engine 10 has an outer body comprising a pair of housings 14 (front) and 16 (rear), a pair of rotor housings 17 and 18, and an intermediate housing 19 between the two rotor housings 17 and 18, all clamped together by bolts 20. The engine housing encloses a pair of chambers 22 and 23 that are defined respectively by inwardly facing peripheral walls 24 and 26 of rotor housings 17 and 18 and opposed, spaced parallel end walls 28, 30 and 32, 34 of the housing 14 and intermediate housing 19 and the latter housing and other housing 16. Each of the peripheral walls 24 and 26 is in the shape of a two-lobe epitrochoid or curve parallel thereto whose center line is indicated at 36. A crankshaft 42 extends through the chambers 22 and 23 and is rotatably supported in main sleeve bearings 44 and 45 which are fixed in stationary gears 46 and 47 that are bolted to the respective housings 14 and 16 as shown in FIG. 1, the crankshaft's axis being coincident with the center line 36 which is parallel to the peripheral walls 24 and 26.

The crankshaft 42 is provided in the housing chambers 22 and 23 with eccentrics 50 and 52 on which hollow rotors 54 and 56 having sleeve bearings 57 and 58 are mounted for rotation about the eccentric centers 59 and 60, these centers being located 180° apart and spaced equal distances from the crankshaft axis 36. The rotors 54 and 56 have the same general shape of a triangle having respectively three faces 61 and 62 which are convex and face the peripheral walls 24 and 26 and cooperate therewith and with the end walls 28, 30 and 32, 34 to define three variable volume working chambers 67 and 68 that are spaced about the rotors and move with the rotors within the engine housing.

A fixed cyclic relation between each of the rotors and the crankshaft is obtained by gearing between each of the rotors and the housing. Referring to rotor 54, there is the stationary gear 46 which is fixed to the housing and is received about and is concentric with the crankshaft 42. The gear 46 meshes with an internal tooth gear 71 that is concentric with and formed on the outboard side of rotor 54. The gear 71 has one and one-half times the number of teeth as the gear 46 with result that this gearing enforces a fixed cyclic relation such that the crankshaft makes three complete revolutions for every one complete revolution of the rotor. Similarly, the other stationary gear 47 meshes with an internal tooth gear 73 on the other rotor 56 with their mesh at a location diametrically opposite that of gears 46 and 71. Thus, the chambers 67 and 68 move with the respective rotors 54 and 56 as they revolve about their axes while also revolving about the crankshaft axis with each chamber twice undergoing expansion and contraction during each rotor revolution.

Sealing of the working chambers such as the working chambers 67 is effected by three apex seals 74 each of which extends the width of the rotor and is mounted in an axially extending slot at one of the rotor apexes, six corner seals 75 each of which is mounted in a hole in one of the rotor sides near one of the rotor apexes, and twelve side seals 76 each of which is mounted in an arcuate groove in one of the rotor sides with these seals arranged in pairs and extending adjacent one of the rotor faces between two of the corner seals with the corner seals each providing a sealing link between one apex seal and the adjacent ends of two pairs of side seals. The apex seals 74 are each spring biased radially outward to continuously engage the peripheral wall 24 and both the corner seals 75 and the side seals 76 in both rotor sides are spring biased axially outward to continuously engage the respective end walls 28 and 30. In addition, there is mounted in grooves in each rotor side inward of the side seals 76 a pair of spring biased circular oil seals 82 which are concentric with the rotor and sealingly engage the opposite end wall to prevent oil from reaching further outward. The rotor 56 carries a similar gas and oil seal arrangement.

A combustible air-fuel mixture is delivered by an induction system, not shown, that includes a carburetor that is mounted on an intake manifold. The intake manifold is connected to the engine housing and has branches that communicate in the engine housing with intake ports 84 and 86 in the respective housing end walls as shown in the end walls 30 and 34 in FIG. 5. Upon rotor rotation the combustible air-fuel mixture is sequentially, periodically admitted to the chambers 67 and 68 as they are expanding by the traversing motion of the rotor sides relative to the respective intake ports whereafter the chambers then close to their intake ports and contract to compress the thus trapped air-fuel mixture in readiness for ignition. Combustion by spark ignition is provided by a suitable ignition system, not shown, which applies voltage at the proper time to pairs of spark plugs 88 and 90 which are mounted on the rotor housings, as shown in FIG. 5, with their electrodes open to the combustion chambers through the respective peripheral walls. For example, the electrodes of the two spark plugs 88 mounted on rotor housing 17 are open to the chambers 67 through the interior peripheral wall 24 and are peripherally spaced thereabout so that one plug leads the other plug relative to rotor rotation. In such an arrangement both plugs are fired at the same time or different times or only one plug is fired according to certain engine operating conditions as is well known. With combustion the peripheral wall takes the reaction to force the rotor to continue rotating and eventually each working chamber following the power phase is exhausted during the exhaust phase by an exhaust port 92 in the peripheral wall 24 that is periodically traversed by the rotor apexes and is open to an exhaust manifold secured to the exterior of the engine housing. The engine structure thus far described is of conventional type and for a more detailed understanding thereof reference may be made to U.S. Pat. No. 2,988,065 and 3,077,867.

Describing now the lubrication system but deferring the details of the oil tank until later, oil is drawn from the oil tank 12 by an oil pump 100 through a suction hole 102 in the bottom of the rear housing 16 and thereafter passes forwardly to the front housing 14 where the oil pump is mounted via a horizontal passage 104 formed in the housings 16, 18, 19, 17 and 14 as shown in FIG. 5. The oil pump 100 is of the internal-external gear type and is mounted about and is driven by the crankshaft 42 as best shown in FIG. 1. Oil pump 100 delivers the oil under pressure to an external cooler, not shown, from which the oil is then directed to a passage 106 in the rear housing shown in FIG. 5. Passage 106 delivers the oil to an oil filter 108 that is mounted on the rear housing and from the filter, oil is delivered to a distribution passage 110 with the pressure feed to the cooler and also the distribution pressure in the engine controlled by suitable pressure regulator valves, not shown, such as disclosed in copending U.S. patent application Ser. No. 432,848, filed Jan. 14, 1974 and assigned to the assignee of this invention. The pressure distribution passage 110 runs into an oil gallery tube 112, shown in FIG. 1, that passes through a passage in the rotor housings 17 and 18 and intermediate housing 19. Tube 112 joins at its opposite ends in the front and rear housings 14 and 16 with long drilled holes 114 and 116, respectively, that run from the gallery toward the center of the housings and stationary gears 46 and 47. The oil gallery tube 112 is a push or press fit in the front and rear housings 14 and 16 so that oil passes through the tube and does not have to cross the several gasketed joints of the engine. Oil is forced into the crankshaft at each end through respective holes 118 and 120 in the front and rear stationary gears 46 and 47, radial holes 122 and 124 in the front and rear main bearings 44 and 45 and radial holes 126 and 128 in the crankshaft 42 to a long axial feed hole 130 in the crankshaft that is drilled from the rear end thereof and is plugged by a press-fitted ball 132. Thus, the main bearings 44 and 45 are fed with oil for lubrication and, in addition, radial holes 134 and 136 connect the axial feed passage 130 to feed oil to the rotor bearings 57 and 58 for their lubrication. In addition, radial orifices 138 and 140 connected to the axial feed passage 130 direct oil radially outwardly between the phase gears 46, 71 and 47, 73 and eccentrics 50 and 52, respectively, to lubricate the phase gears and also to pass into the interior of the respective rotors 54 and 56 to effect their cooling. The rotors each have an internal web 142 with holes 144 to provide for circulation therethrough in an axial direction with the oil then exiting outwardly of the rotor and into cavities 146 and 148 in the front and intermediate housings 14 and 19 in the case of rotor 54 and into the intermediate cavity 148 and a cavity 150 in the rear housing 16 in the case of rotor 56. Oil in the pressurized distribution passage 110 is also delivered to an oil metering pump, not shown, which meters oil at a suitable rate to lubricate the rotors' gas seals. This oil metering pump may be of the type disclosed in copending U.S. application Ser. No. 357,072, filed May 3, 1973, now U.S. Pat. No. 3,841,803, and assigned to the assignee of this invention and may be connected to meter oil to mix with the fuel in the carburetor or to oil feed ports in the housing end walls.

Figure 4:
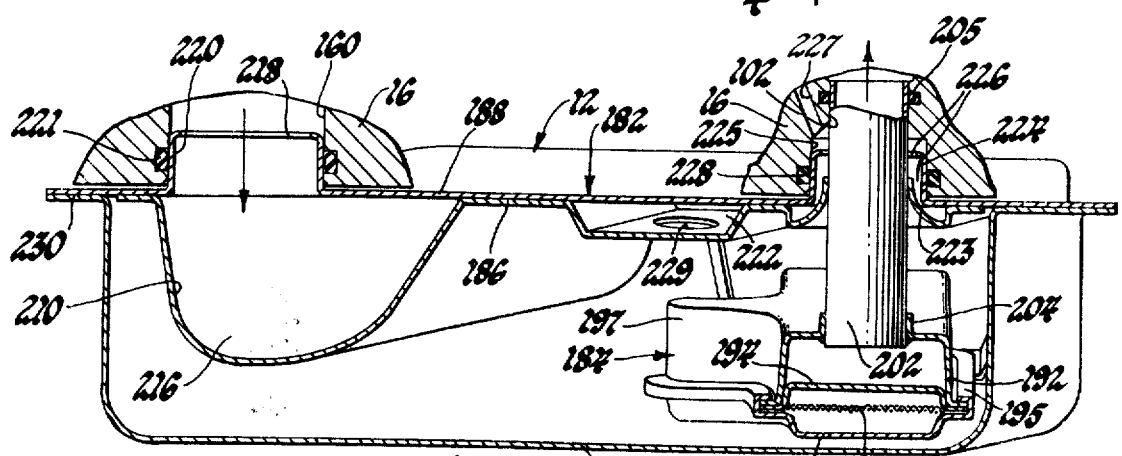
FIG. 4 is a view taken along the line 4—4 in FIG. 3.

The oil after leaving the main bearings, rotor bearings, phase gears and rotor cavities, falls through the cavities 146, 148 and 150 to a horizontal drain passage 158 that extends through the housings as shown in FIGS. 1 and 5. The oil then drains to the oil tank 12 through a drain-vent hole 160 in the rear housing 16 as best shown in FIGS. 4 and 5. Air is vented internally in the engine by a continuous air flow which is effected by the provision of a breather passage 162 in the front housing 14 which is connected by a hose 164 to pull air from the engine's air cleaner and the provision of an air-oil separator 166 which is mounted on the rear housing 16 and is connected by a hose 168 and a PCV valve, not shown, to the carburetor and has a construction which is operative to permit air to be pulled from a top cavity 170 in the rear housing to the carburetor while separating out and draining oil to the drain cavity 150. In this air flow system there are three parallel air paths through the housings, namely the drain passage 158 which carries air along with the oil from the front housing to the oil tank, an upper vent passage 172 that can carry air from either the front housing breather cavity 162 to the rear housing vent cavity 170 or in the reverse direction to compensate for the air carried from the oil drain passage and a third passage which is through the hollow rotors. In addition, the upper vent passage, the rotor vent passage and the drain passage are connected in the front, intermediate and rear housings for cross-flow and pressure equilization as shown in FIGS. 1 and 5. These connecting passages in the front, intermediate and rear housings are provided with configurations 174 and deflectors 175 as shown on the intermediate and rear housings in FIG. 5 which act to prevent oil splash up into the vent passage 172 and to the air-oil separator 166. Furthermore, any combustion gas blowby from the rotors through the connecting passages in the front, intermediate and rear housings is thus free to move up to the vent passage 172 through the air-oil separator 166 and the PCV valve out to the carburetor.

In the actual vehicle installation, the engine 10 is inclined as shown in FIG. 1 with the front or right-hand end of the crankshaft 42 slightly above the rear or left-hand end thereof and the bottom of the oil tank 12 horizontal to the ground. Furthermore, it will be understood that while this is the normal engine operating position in the vehicle, the vehicle may be shipped in a vertical position with the front end down. In such event, it is desirable that the oil not be permitted to drain from the then elevated oil tank 12 back into the engine.

Figure 3:
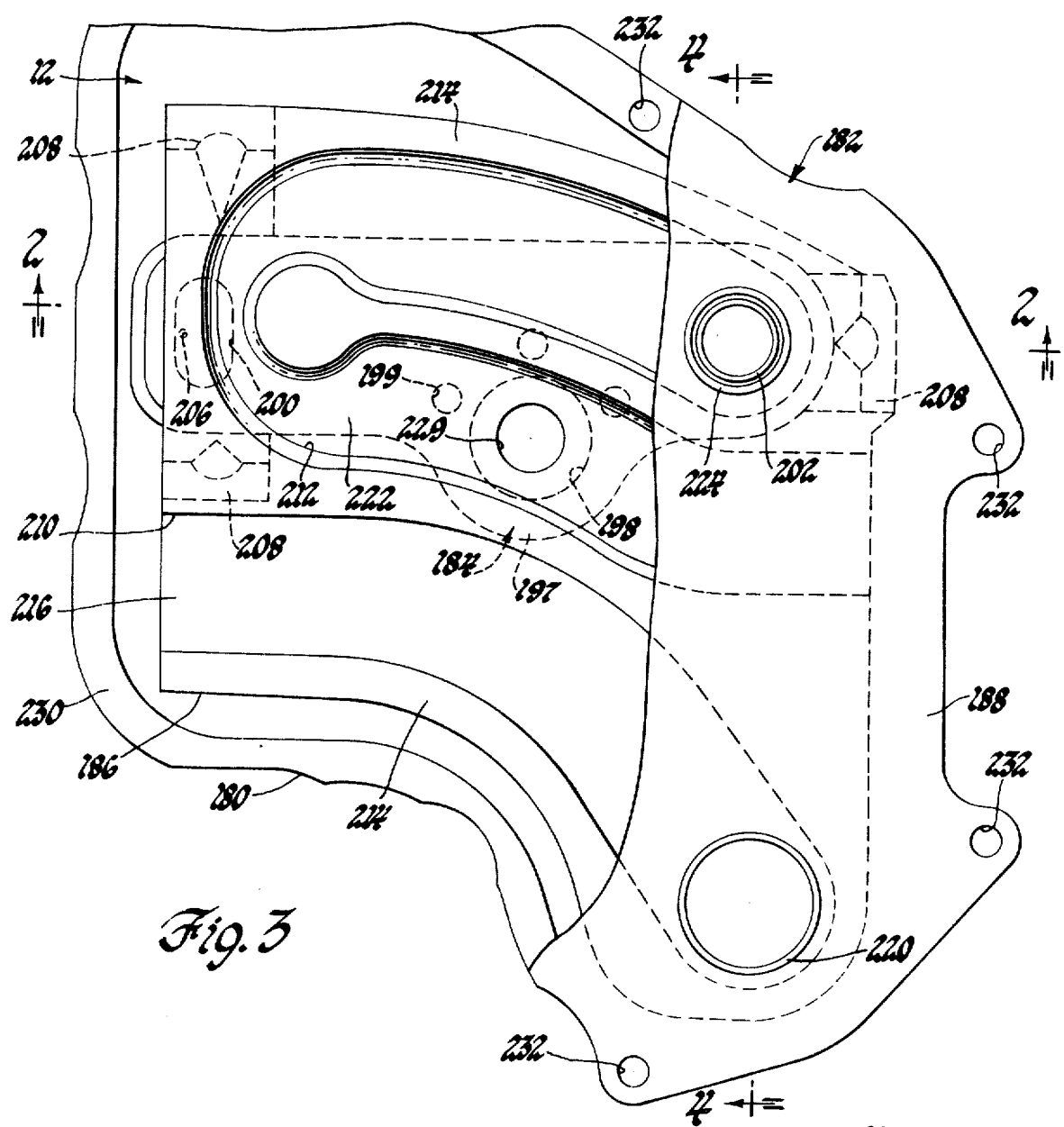
FIG. 3 is an enlarged top view of the oil pan in FIG. 1.

The oil tank 12 according to the present invention is vented to the engine rather than to atmosphere and is readily mass producible as a stamped sheet metal fabrication that easily bolts to the engine. The oil tank 12 in the preferred embodiment comprises a stamped sheet metal pan 180 that is formed to provide a deep reservoir which is generally rectangular in vertical cross-section, as seen in FIGS. 2 and 4, and is boot-shaped in a horizontal plane or plan view, as seen in FIGS. 3 and 6, this boot-shape providing the maximum volume in a certain confined space in the vehicle. A cover or top assembly designated as 182 in FIG. 6 fits into and over the pan 180 and comprises a screen and suction pipe subassembly 184, a stamped sheet metal inner cover or anti-drainback member 186 and a stamped sheet metal outer cover or top 188.

The screen and suction pipe subassembly 184 comprises three pan-shaped sheet metal stampings; namely, a bottom piece 190, a top piece 192 and an anti-drainback inner wall piece 194 as best shown in FIGS. 2 and 4. A screen 196 of suitable size mesh is arranged between the concave sides of the bottom 190 and the inner wall 194 and the concave side of the top 192 is deeper and arranged over the convex side of the inner wall. These sheet metal pieces have abutting peripheral flanges which are secured along their length by rolling over the bottom member's flange 195 which is extended for that purpose. These parts are elongated to extend almost the length of the reservoir as seen in FIG. 2 and have a transverse extending projection 197 as shown in FIGS. 3, 4 and 6 to locate an intake hole 198 in the bottom 190 of this projecting portion in the center of the oil reservoir. The intake hole 198 is elevated at a minimum height in the reservoir by three bumps 199 that project upwardly from oil pan 180 and engage the bottom piece 190 of subassembly 184 as shown in FIG. 2. Oil after being drawn into the intake hole 198 passes through the screen 196 and then through a hole 200 in the inner wall 194 near the rear end thereof and then between the inner wall and the top 192 to the lower end of a vertical suction pipe 202 which projects through and is welded to a collar 204 formed on the top near the front end thereof. The upper end of suction pipe 202 is received by the engine's suction hole 102 and an O-ring 205 is provided to seal this connection as shown in FIG. 4. In addition, there is provided an anti-siphon hole 206 in the bottom 190 near the rear end thereof very much smaller than the intake hole 198 to prevent siphoning as will be described in more detail later.

The screen and suction pipe assembly 184 is secured to the underneath side of the inner cover 186 by three straps 208 which at their lower ends are welded to the underside of the bottom piece's flange 195 and at their upper ends are welded to the underside of the inner cover. The top side of the inner cover 186 has a pair of channels 210 and 212 formed therein and a remaining planar portion 214 which is sealed by a suitable sealing compound and then welded to the underside or ceiling of the outer cover 188. The channel 210 is relatively deep and wide and in cooperation with the ceiling of the outer cover 188 provides a longitudinal drain-vent passage 216. Passage 216 is open at one end to a drain-vent hole 218 provided by a vertical tubular portion 220 which is formed on the top side of the outer cover 188 near the front end and fits closely in the engine's drain-vent hole 160 with an O-ring 221 provided to seal this connection of the oil tank with the engine. The drain-vent passage 216 extends to the rear end of the inner cover 186 to open to the reservoir near the rear end thereof to prevent drainback as will be described in more detail later. A U-shaped vent passage 222 is provided by the other channel 212 which extends at one end as an annulus about a vertical tubular portion 223 which is formed on the top side of the inner cover 186 near the front end and projects with clearance up into a tubular portion 224 which is formed on top of the outer cover 188. The tubular portion 224 projects up into close fitting relationship with an enlarged portion 225 of the engine's suction hole 102 as shown in FIG. 4. The suction pipe 202 extends up through tubular portions 223 and 224 to fit close in the engine's suction hole 102 and these tubular parts are sized to leave an annular clearance 226 between the tubular portions 223 and 224 of the inner and outer covers and also between the tubular portion 224 and suction pipe 202 and no clearance between the inner cover's tubular portion 223 and the suction pipe so that there is sealing engagement between these latter two parts. The enlarged hole portion 225 is connected above the outer cover's tubular portion 224 to a quiet zone such as in an upper region in the vented cavity 150 in the rear housing by a long vent hole 227 shown in FIGS. 4 and 5 and thus provides a vent access for the passage 226 between suction pipe 202 and the outer cover's tubular portion 224, there being provided an O-ring 228 to seal this connection of the oil tank with the engine. This enables air to escape from the tank through vent hole 227 independently of oil draining into the tank and air escaping through drain-vent hole 218. The channel 212 is shallow at this front end and gradually increases in depth as it extends rearward with a downward slope along the underneath side of the outer cover to a location near the rear end of the reservoir and then turns and extends forward still with a downward slope to a hole 229 at the center of the oil tank and above the normal oil level that occurs with shifting of the oil level during engine operation with the vehicle either accelerating, decelerating or turning. The channel 212 thereafter continues at a relatively constant depth to the front end of the inner cover where it opens to the reservoir.

The pan 180 has a peripheral flange 230 which is welded to the underneath side of the outer cover 188 along its periphery. The oil tank 12 is secured to the engine by means of four holes 232 which extend through the pan 180 and outer cover 188 and receive bolts 234 as shown in FIGS. 1 and 5 with two of these bolts engaging the rear rotor housing 18 and the other two bolts engaging the rear housing 16.

Describing now the flow to and from the oil tank 12 and also the venting of the oil tank that is provided by the above described structure, oil is drawn through the suction hole 198 then through the screen 196 to the rearwardly located hole 200 whereafter it passes forward and then up through the suction pipe 202 to the engine's lubrication system while an equal flow from the engine's internal drain system drains to the engine's drain-vent hole 160 where it then passes through the oil tank's drain-vent hole 218 and is conveyed in the oil tank by the drain-vent passage 216 to replenish the oil reservoir. This returning oil carries with it a substantial amount of air trapped in the form of foam which must be removed from the closed oil tank to allow the oil to continue to return. This air is vented in part by making the drain-vent connection as large as practical to allow air to back up through the same hole it came down; however, venting of the oil tank to the drain-vent hole is impeded by the presence of the inner cover 186. To overcome any such impedance of the venting, air from the top of the tank is also allowed to vent through the vent passage 222 with the downward slope of this passage causing oil that is pulled in with the air to drain down and out through the hole 229. Furthermore, the flow area of this vent passage is made sufficiently large enough to keep air velocity low enough so that it will not carry much oil with it. It will also be appreciated that the drain hole 229 is located at the center of the tank and above the highest normal oil level so that this vent is always open to the interior of the oil tank above the oil level.

Describing now the anti-drainback effect that is provided when the engine is in a transporting position wherein its crankshaft is in a vertical or substantially vertical position with the front end down but which however forms no part of this invention, the hole 200 in the screen and suction pipe assembly 184, the reservoir end of the drain-vent passage 216 and the turnaround of the vent passage 222 are all located near the rear end of the tank and thus in an elevated or top location when the engine is in its transporting position. These passage portions are all located so that with normal oil fill the oil cannot spill over the dams they thus provide and is thereby trapped in the oil tank and prevented from draining back into the engine. Furthermore, the antisiphon hole 206 in the bottom of the screen and suction pipe assembly 184 acts in the engine transporting position to break any vacuum at this location and thereby prevent siphoning that might otherwise occur and would force oil through the anti-drainback hole 200.

The above described embodiment is illustrative of the invention which may be modified within the scope of the appended claims.

I claim:

1. An oil tank, an engine, means for detachably securing said oil tank to said engine in an underneath location, said oil tank having a top and a bottom and at one end extending underneath the engine and at the other end projecting outward of the engine, said top having a drain-vent hole adjacent said one end of said oil tank providing a drain-vent passage for receiving oil draining from a first hole in the engine and also venting said oil tank to the engine, seal means for sealing said oil tank to the engine to prevent leakage from said drain-vent passage, said top further having a suction-vent hole adjacent said one end of said oil tank for communicating said oil tank with a second hole in the engine, suction passage means extending through said suction-vent hole and the second hole in the engine and also extending in said oil tank along said bottom a predetermined distance to an opening at said bottom at a location intermediate said ends of said oil tank where oil remains available during shifting of the oil level in said oil tank during engine operation whereby oil can be suctioned from said oil tank through said suction passage means to lubricate the engine during engine operation, said suction passage means and said top around said suction-vent hole defining an annular vent passage for also venting said oil tank to the engine, seal means for sealing said oil tank to the engine to prevent leakage from said vent passage, passage means in said oil tank connected to said drain-vent passage whereby oil is allowed to drain from said engine into said oil tank during engine operation, and additional passage means in said oil tank connected to said vent passage having an opening at a location intermediate said ends of said oil tank above the highest normal oil level in said oil tank that occurs with shifting of the oil level in said oil tank during engine operation whereby venting of said oil tank is provided through said vent passage but oil is prevented from entering said vent passage during shifting of the oil level in said oil tank during engine operation.

2. A rotary engine having a front housing and a rear housing, said rear housing having located underneath a drain-vent hole to which oil drains and through which air can be vented into the engine and also having located underneath a suction-vent hole through which oil can be supplied to the engine's lubrication system and also through which air may be vented into the engine, an oil tank, means for detachably securing said oil tank to said engine in an underneath location, said oil tank having a top and a bottom and at one end extending underneath said rear housing and at the other end projecting outward of said rear housing, said top having a drain-vent hole adjacent said one end of said oil tank providing a drain-vent passage for receiving oil draining from said engine drain-vent hole and also venting said oil tank to the engine, seal means for sealing said oil tank to the engine to prevent leakage from said drain-vent passage, said top further having a suction-vent hole adjacent said one end of said oil tank for communicating said oil tank with said engine suction-vent hole, suction passage means extending through said suction-vent holes and also extending in said oil tank along said bottom a predetermined distance toward said other end of said oil tank to an opening at said bottom at a location intermediate said ends of said oil tank where oil remains available during shifting of the oil level in said oil tank during engine operation whereby oil can be suctioned from said oil tank through said suction passage means to lubricate the engine during engine operation, said suction passage means and said top around said suction-vent hole defining an annular vent passage for also venting said oil tank to the engine, seal means for sealing said oil tank to the engine to prevent leakage from said vent passage, passage means in said oil tank connected to said drain-vent passage whereby oil is allowed to drain from said engine into said oil tank during engine operation, and additional passage means in said oil tank connected to said vent passage and extending along said top a predetermined distance toward said other end of said oil tank to an opening at a location intermediate said ends of said oil tank above the highest normal oil level in said oil tank that occurs with shifting of the oil level in said oil tank during engine operation whereby venting of said oil tank is provided through said vent passage but oil is prevented from entering said vent passage during shifting of the oil level in said oil tank during engine operation.

3. A rotary engine having a front housing and a rear housing, said rear housing having located underneath a drain-vent hole to which oil drains and through which air can be vented into the engine and also having located underneath a suction-vent hole through which oil can be supplied to the engine's lubrication system and also through which air may be vented into the engine, an oil tank, means for detachably securing said oil tank to said engine in an underneath location, said oil tank having an outer stamped sheet metal cover, a stamped sheet metal pan and a stamped sheet metal inner cover and at one end extending underneath the engine and at the other end projecting outward of the engine, said outer cover having a drain-vent hole adjacent said one end of said oil tank providing a drain-vent passage for receiving oil draining from said engine drain-vent hole and also venting said oil tank to the engine, seal means for sealing said outer cover to said rear housing to prevent leakage from said drain-vent passage, said outer cover further having a suction-vent hole adjacent said one end of said oil tank for communicating said oil tank with said engine suction-vent hole, suction passage means extending through said suction-vent holes and also extending in said oil tank along the bottom of said pan a predetermined distance toward said other end of said oil tank to an opening at the bottom of said pan at a location intermediate said ends of said oil tank where oil remains available during shifting of the oil level in said oil tank during engine operation whereby oil can be suctioned from said oil tank through said suction passage means to lubricate the engine during engine operation, said suction passage means and said outer cover around said suction-vent hole defining an annular vent passage for also venting said oil tank to the engine, seal means for sealing said outer cover to said rear housing to prevent leakage from said vent passage, said inner cover having a channel cooperating with said outer cover to provide a vent passage that is connected to said drain-vent passage and extends along said outer cover and said inner cover a predetermined distance toward said other end of said oil tank to an opening whereby oil is allowed to drain along a vented passage from said engine into said oil tank during engine operation, and said inner cover having an additional channel cooperating with said outer cover to provide an anti-drainback passage that is connected to said annular vent passage and extends along said outer cover and said inner cover a predetermined distance toward said other end of said oil tank to an opening at a location intermediate said ends of said oil tank above the highest normal oil level in said oil tank that occurs with shifting of the oil level in said oil tank during engine operation whereby venting of said oil tank is provided through said vent passage but oil is prevented from entering said vent passage during shifting of the oil level in said oil tank during engine operation.

* * * * *